United States Patent [19]

Kilgore

[11] Patent Number: 4,674,356
[45] Date of Patent: Jun. 23, 1987

[54] DYNAMIC ROTATIONAL COUNTERBALANCE STRUCTURE

[76] Inventor: Ronald B. Kilgore, 4928 Neosho, Roeland Park, Kans. 66205

[21] Appl. No.: 729,368

[22] Filed: May 1, 1985

[51] Int. Cl.$^4$ ............................................. F16F 15/22
[52] U.S. Cl. ............................ 74/573 R; 301/5 BA; 74/573 F
[58] Field of Search ............... 74/573 R, 573 F, 574; 301/5 BA, 5 B

[56] References Cited

U.S. PATENT DOCUMENTS 2,909,389 10/1959 Wilborn .
3,696,688 10/1972 Goodrich et al. .
3,733,923 5/1973 Goodrich et al. .
3,799,619 3/1974 LaBarber .
3,913,980 10/1975 Cobb, Jr. .
3,953,074 4/1976 Cox .
4,075,909 2/1978 Deakin .
4,269,451 5/1981 Narang .

Primary Examiner—Henry A. Bennett
Attorney, Agent, or Firm—Litman, Day & McMahon

[57] ABSTRACT

A dynamic rotational counterbalance structure includes a discoid balance body having a groove or race formed in an outer circumferential surface of the body. A plurality of movable weights such as spherical weights are positioned in the groove along with a lubricating and noise damping fluid. The groove is closed by an outer circumferential band. At least two of the balance structures are affixed coaxially on a rotatable member to be balanced. During rotation of the member so balanced, the weights shift circumferentially to offset unbalancing forces which influence the rotating member.

8 Claims, 5 Drawing Figures

DYNAMIC ROTATIONAL COUNTERBALANCE STRUCTURE

FIELD OF THE INVENTION

The present invention relates to rotational counterbalance structures and, more particularly, to a practical configuration of such a structure and the manner of installation of such a structure on a rotating shaft as of an internal combustion engine.

BACKGROUND OF THE INVENTION

Machine members which rotate, particulary at high speeds, need to be rotationally balanced. Otherwise, the imbalances cause forces to act on the member in a direction perpendicular to the axis of rotation resulting in undesired vibrations and uneven and accelerated wear of bearings which support such members. The usual solution is to statically balance the member by adding weights about the member, as is done to balance auto tires, or by removing weight about the member as by drilling holes at the appropriate locations. As long as the magnitude and direction of the forces and loads applied to the rotating member are relatively constant, static balancing usually results in smooth rotation of the member.

When forces are applied to a rotating member in a pulsed manner or in such a manner that the direction of such forces changes during application of the forces, as happens with the crankshaft of an internal combustion engine and in other machinery, such forces have the potential for inducing rotational imbalances in the rotating member even if the member is statically balanced. Crankshaft counterweights, a flywheel, and often a harmonic balancer are affixed to a crankshaft to minimize the vibrations which result from the nature of the forces which act on the crankshaft. In a reciprocating piston engine, the power pulses or firing strokes are pulsed and cyclic. However, the effects of the counterweights, flywheel, and harmonic balancer are continuous. In engines with relatively numerous cylinders, such as six, eight, or more, the power pulses are more evenly spaced over the crankshaft rotation cycle. In engines with relatively fewer cylinders, such as four, two, or one, it is difficult to evenly time the power pulses whereby these engines tend to vibrate more than engines with more cylinders.

Dynamic rotational balance devices have been developed to overcome some of the limitations of static balancing of rotational members. In general, a dynamic balancer consists of a circumferential race or groove in which are placed movable weights, usually spherical and metal. As the member on which the dynamic balancer is affixed rotates, the weights shift circumferentially to counteract rotational imbalances that occur. Many of the rotational balance devices that have been proposed while theoretically capable of performing their desired function, are configured such that the manufacture of such devices would be difficult and expensive. For example, several known balance devices of this type employ races formed of circular tubes. It would be difficult to shape such a tubular member as a precise circle. Failure to precisely shape such a race member could contribute to the rotational imbalance problem. At least one known balance arrangement for railway wheels provides an annular cavity which is formed when the wheel is cast. It is proposed that the cavity could be formed by a mold core of sand which is later removed. While such a manufacturing process is possible, it would be expensive and could not be carried out with a great degree of precision or smoothness of the race.

SUMMARY OF THE INVENTION

The present invention provides a method of manufacturing a dynamic rotational counterbalance structure by which such a balance device can be economically made. In particular, a circumferential groove or race is cut or otherwise formed in an outer circumferential surface of a discoid body and a circumferential band is shrink fitted onto the body. An access aperture is bored into body prior to cutting the groove and a plug member is threaded thereinto such that the inside end of the plug is cut at the same time as the groove and, therefore, conforms to the shape of the groove. After the groove has been formed and the band has been placed, the weights such as metal balls are inserted in the groove along with a lubricating and damping fluid. Thereafter, the plug is irremovably replaced in the aperture. The balance structure manufactured by the preceding steps is installed on a rotating member in pairs on opposite sides of structures which engage the member in such a manner as to cause dynamic rotational imbalances in the member.

OBJECTS OF THE INVENTION

The principal objects of the present invention are: to provide such a structure which substantially reduces the vibrations and uneven bearing wear associated with unbalanced rotating members; to provide such a structure of a configuration which facilitates the manufacture thereof; to provide such a structure which is particularly suited to balancing the crankshafts of reciprocating internal combustion engines including motorcycle engines; to provide such a structure which can be incorporated internally within an engine; to provide such a structure in pairs on opposite ends of an engine crankshaft; to provide such a structure which can be retrofitted to many existing engines; to provide such a structure which does not increase the noise level emitted by an engine having such structure installed thereon; to provide such a structure for certain engine applications which increases the energy efficiency of the engine by replacing solid discoid flywheels with the balance structures thereby reducing the rotating mass on the crankshaft; to provide a method of manufacturing such a structure; and to provide such a dynamic rotational counterbalance structure which is economical to manufacture, safe and effective in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE PREFERRED EMBODIMENTS

Figure 1:
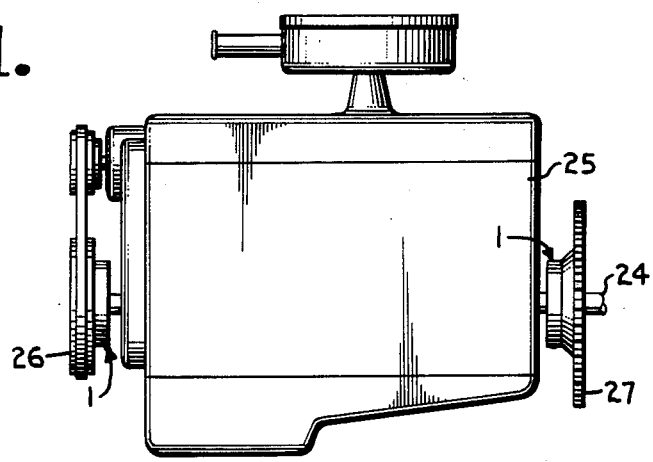
FIG. 1 is a side elevational view of an internal combustion engine on which are installed a pair of dynamic rotational counterbalance structures according to the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a dynamic rotational counterbalance structure according to the present invention. In general, the structure 1 includes a discoid balance body or disk 2 having a circumferential groove or race 3 formed therein which contains circumferentially movable weights 4. The structure 1 is installed on a rotating member, and the weights 4 shift to counterbalance rotational imbalances which occur in the rotating member. According to the present invention, at least a pair of the structures 1 is installed on the rotating member on axially opposite sides of the location at which the imbalances occur.

Figure 2:
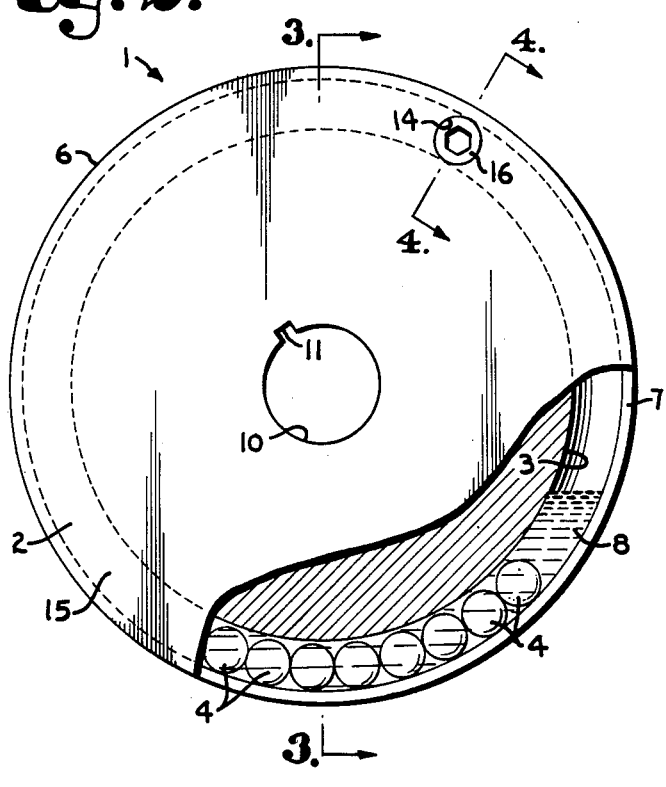
FIG. 2 is an enlarged elevational view of a rotational balance structure according to the present invention with a portion broken away to illustrate details of a circumferential race with movable weights therein.
Figure 3:
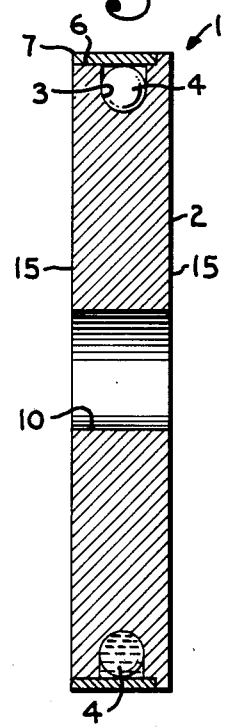
FIG. 3 is a diametric sectional view of the balance structure taken on line 3—3 of FIG. 2 and illustrates further details of the balance structure.
Figure 4:
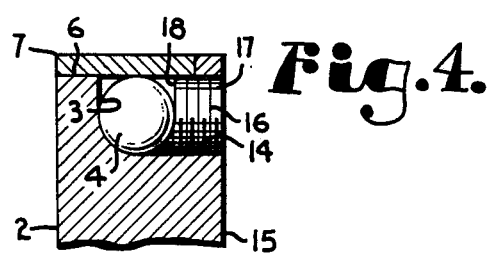
FIG. 4 is an enlarged fragmentary sectional view taken on line 4—4 of FIG. 2 and illustrates details of an access aperture and plug of the balance structure.

Referring to FIGS. 2, 3, and 4, the disk 2 is formed of a strong, dense material such as steel or another metal. The race or groove 3 is formed in an outer cylindrical surface 6. A number of the weights 4 are positioned within the groove 3, and the groove is enclosed by a band 7 which encircles the disk 2. Preferably, a lubricating and noise damping fluid 8, such as an oil, is also placed in the groove. The number of weights 4 present in the race 3 depends on a number of factors including the relative dimensions of the groove and the disk 2, the mass of the weight members 4, the number of structures 1 employed, and the nature of the imbalances which the structure 1 is intended to counterbalance.

The structure 1 includes means for affixing same to a rotating member. The illustrated disk 2 has an axial bore 10 formed therein. A keyway 11 in the bore 10 provides for the placement of a key member (not shown) to prevent the disk 2 from rotating relative to the member on which it is mounted. Alternatively, other means of attaching the disk 2 to a rotating member could be provided, such as a circular pattern of bolt holes (not shown).

The structure 1 may be manufactured in any practical manner. The present invention provides a particular method of manufacturing the structure 1. A race access aperture 14 is drilled in one of the bases or sides 15 of the disk 2, and the aperture 14 is tapped with threads. The aperture 14 has a diameter which will clear the diameter of the weights 4 for insertion thereof into the groove 3. The aperture 14 is located at a radial position of the disk 2 for intersection with the groove 3 which will later be formed. A threaded aperture plug 16, such as the illustrated Allen screw, is threaded into the aperture 14 until an outer face 17 of the plug is at least flush with base 15 of the disk 2 in which the aperture 14 is drilled. The groove 3 is then cut into the cylindrical surface 6, as by use of a lathe. The groove 3 is sized and shaped to allow free circumferential movement of the weights 4. The groove 3 is cut into the inner end 18 of the plug 16 such that the inner end 18 conforms to the shape of the groove 3 to prevent interference to movement of the weights 4 in the groove 3. After the groove 3 is formed, the position of the plug 16 is marked in such a manner that the plug can be removed and replaced in the same position as it was in when the groove 3 was formed. Thereafter, the plug 16 is removed.

The band 7 is endless and is installed on the disk 2 in such a manner as to seal the groove 3. Preferably, the disk 2 is refrigerated to contract same, and band 7 is heated to expand same. Thereafter, the band 7 is pressed onto the disk 2, and the temperatures of the band and disk are allowed to equalize to thereby shrink the band into sealing contact with the disk. Excessive tension in the band 7 is not desirable and might cause the band 7 to rupture under certain circumstances.

Figure 5:
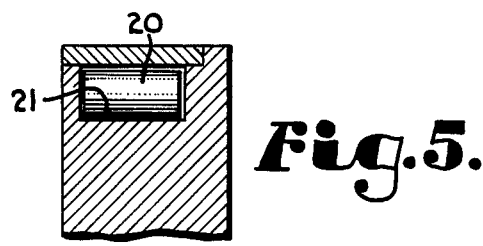
FIG. 5 is a view similar to FIG. 4 and illustrates a modified embodiment of the balance structure in which cylindrical movable weights are employed.

After the band 7 is installed, the weights 4 are inserted through the aperture 14 into the groove 3. If a lubricant 8 is employed in the structure 1, it is also introduced through the aperture 14. The lubricant 8 should be as light in weight and low in viscosity as possible to avoid interference with the movement of the weights 4 about the groove 4. Further, the lubricant should be stable at the operating temperature which the structure 1 will experience. This is especially important if the structure 1 is installed internally within an internal combustion engine. In general, the use of a lubricant 8 is not absolutely necessary if the weights 4 and the groove 3 are smooth and clean. The frictional loading between the weights 4 and between the weights 4 and the surfaces of the groove 3 and the band 7 is not so high that excessive wear would be a problem. The presence of the lubricant 8 is desirable principally to cushion between the weights 4 as they are shifted to reduce or damp noise resulting from collisions amoung the weights 4. When a lubricant 8 is employed, it is important that sufficient clearance be provided between the walls of the groove 3 and the weights 4 to minimize hydraulic resistance to the movement of the weights. Such clearance is provided if the cross sectional shape of the groove 3 is as illustrated in FIG. 4 wherein the groove 3 has a D-shaped cross section and the weights 4 are spherical. If cylindrical weights 20 are employed, as illustrated in FIG. 5, it might be necessary to provide additional clearance between the walls of the groove 21 therein and the weights 20 to prevent hydraulic resistance to the movement of the weights 20.

The aperture 14 is closed by replacing the plug 16 in the same position as it was in when the groove 4 was cut. Preferably, the plug 16 is irremovably locked in the aperture 14 to prevent tampering therewith. For example, the plug 16 could be coated with an adhesive sealant such as Green Loctite (trademark of the Loctite Corp. of Newington, Conn.) prior to replacement in the aperture 14. After such a sealant has cured, the plug 16 can only be removed by drilling same out. Thereafter, it would be difficult to shape the inner end of a replacement to conform to the shape of the groove 4 such that the inner end or portions of the aperture 14 would interfere with the free movement of the weights 4.

In use, the structure 1 is usually installed in pairs on the rotating member to be dynamically balanced. As illustrated in FIG. 1, a pair of the structures 1 is affixed at opposite ends of a crankshaft 4 of a reciprocating internal combustion engine 25. A front balancer 1 is associated with a belt pulley 26 which drives other accessories of the engine 25 such as the alternator. A rear balancer 1 is associated with a flywheel 27 of the engine 25. Because of the relative length of the crankshaft 24, and the presence of intervening crankshaft bearings (not shown) within the engine 25, one end of the crankshaft is isolated from the other end, to an extent. As a result, a balance structure at one end of the crankshaft would have little effect on the vibrational situation at the other end. Consequently, it is desirable to provide the balance structures 1 at multiple locations along the length of the crankshaft. A minimum of two balance structures 1 is required to dynamically balance an engine crankshaft with the balance structures positioned on axially opposite sides of the location of engagement of the unbalancing influence, that is, the piston connecting rods of the engine. More balance structures 1 are desirable depending on the overall length of the crankshaft, the diameter of the disk 2 of the balance structure, and the combined mass of the weight members 4 within the balance structure.

In developmental testing of the present invention, the balance structure 1 was applied to a motorcycle engine. The engine drives a "Sportster" motorcycle and was manufactured by Harley-Davidson Co. Inc. of Milwaukee, WI, has two cylinders positioned in a 45 degree "V" arrangement, and displaces about fifty to sixty cubic inches. The invention was incorporated internally within the engine by modifying the flywheels therein. The flywheels perform the functions of crank throws and counterweights in addition to the functions of flywheels and are approximately eight to nine inches in diameter and from one to one and three quarters inches in thickness.

When the engine was reassembled and tuned up, the reduction in vibrations was noticeable. A handlebar mounted rearview mirror which was previously unusable even with optimum tuning of the engine because of transmitted vibrations now provides a steady rearview image. Since the application of the invention to this engine resulted in the removal of material from members on the engine shaft, it is probable that an increase in fuel efficiency will result since the mass of the shaft has been reduced.

It is to be understood that while certain forms of the present invention have been illustrated and described herein, it is not to be limited to the specific forms or arrangement of parts described and shown.

What is claimed and desired to be secured by Letters Patent is as follows:

1. A dynamic rotational counterbalance flywheel for balancing a rotating mass comprising:
   (a) a discoid counterbalance body attached coaxially to a mass rotatable about an axis of rotation;
   (b) an outer circumferential groove formed in said body;
   (c) a plurality of movable weight means positioned within said groove, said weight means being sized and shaped to move freely about said groove; and
   (d) a continuous outer circumferential band positioned in surrounding relation to said body to cover and enclose said groove.

2. A structure as set forth in claim 1 including:
   (a) a lubricating and noise damping fluid sealed within said groove.

3. A structure as set forth in claim 1 wherein:
   (a) said movable weight means are spherical balls.

4. A structure as set forth in claim 1 wherein:
   (a) said movable weight means are cylindrical roller weights.

5. A dynamic rotational counterbalance arrangement for balancing an elongated rotating shaft comprising:
   (a) an elongated shaft rotatable about an axis of rotation;
   (b) at least two self-balancing flywheel members, each flywheel member including:
      () a discoid counterbalance body having an axis of rotation and an outer circumferential surface;
      (2) an outer circumferential groove formed in said outer surface of said body;
      (3) a plurality of movable weight means positioned within said groove, said weight means being sized and shaped to move freely about said groove; and
      (4) a continuous outer circumferential band positioned in surrounding relation about said body to enclose said groove; and
   (c) said flywheel members being affixed in coaxial relation to said shaft at longitudinally spaced positions thereon.

6. An arrangement as set forth in claim 5 wherein means which rotationally unbalance said shaft engage said shaft intermediate the ends thereof and wherein:
   (a) said balance members are affixed on said shaft on axially opposite sides of the position of engagement of means which tend to rotationally unbalance said shaft.

7. An arrangement as set forth in claim 5 including:
   (a) a plurality greater than two of said balance members coaxially affixed to said shaft at longtudinally spaced positions along said shaft.

8. An arrangement as set forth in claim 5 wherein:
   (a) said shaft is a crankshaft of an internal combustion engine.

* * * * *